United States Patent
Plush et al.

(10) Patent No.: US 6,173,171 B1
(45) Date of Patent: *Jan. 9, 2001

(54) METHOD AND APPARATUS FOR GENERATING BILLING DATA IN A TELECOMMUNICATION SYSTEM

(75) Inventors: Christopher Plush, Kingston Bagpuze; Shelaine Green, Ware; David Roat, St. Albens; Michael Ferguson, Montpelier; Brian Carr, Solihull, all of (GB)

(73) Assignee: Orange Personal Communications Services LTD, Bristol (GB)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/966,800

(22) Filed: Nov. 10, 1997

(30) Foreign Application Priority Data

May 23, 1997 (GB) ................................................ 9710730

(51) Int. Cl.[7] ................................................. H04M 11/00
(52) U.S. Cl. ........................... 455/408; 455/518; 455/519; 379/114; 379/116
(58) Field of Search .................................. 455/408, 405, 455/406, 407, 433, 432, 416, 463, 519, 422; 379/111–115, 117, 121, 124–128, 130, 134; 340/825.44

(56) References Cited

U.S. PATENT DOCUMENTS

| 5,345,498 | * | 9/1994 | Mauger | 455/406 |
|---|---|---|---|---|
| 5,359,642 | | 10/1994 | Castro . | |
| 5,483,575 | * | 1/1996 | Zdanowski et al. | 455/508 |
| 5,561,706 | * | 10/1996 | Fenner | 455/406 |
| 5,670,950 | * | 9/1997 | Otsuka | 455/411 |
| 5,697,060 | * | 12/1997 | Akahane | 455/38.1 |
| 5,812,945 | * | 9/1998 | Hansen et al. | 455/403 |
| 5,826,185 | * | 10/1998 | Wise et al. | 455/405 |
| 5,953,400 | * | 9/1999 | Rosenthal et al. | 379/202 |

FOREIGN PATENT DOCUMENTS

| 44 19 651 | 12/1995 | (DE) . |
|---|---|---|
| 0 346 897 | 12/1989 | (EP) . |
| WO 93/03571 | 2/1993 | (WO) . |
| WO 96/20570 | 7/1996 | (WO) . |

OTHER PUBLICATIONS

"We Get You the Most From Your Cellular Phone" Brochure. Authored and Published by Bell Atlantic Mobile Systems Brochure p. 4, Jul. 1990.*

"Personal Rates" Brochure. Authored and Published by Cellular One, p. 1, Nov. 1991.*

"Washington Baltimore Cellular Service Area" Brochure. Authored and Published by Bell Atlantic Mobile Systems, p. 1, Sep. 1992.*

* cited by examiner

Primary Examiner—Nay Maung
Assistant Examiner—Charles Craver
(74) Attorney, Agent, or Firm—Knobbe, Martens, Olson & Bear LLP

(57) ABSTRACT

A billing center for a mobile communication system is provided which allows groups of subscribers sharing a single account to be identified both during the call rating procedure, during which call detail records are related to add a charge to the call detail record, and/or to add a usage of a pre-paid usage allocation to be added to the call detail records, and during the production of billing details at the end of the billing period. A relational database holds usage allocation records which pertain either to a single subscriber, or to a group of subscribers. The group of subscribers may consist of any of 2 to 50, or more, subscribers, depending on the subscription type held by the group.

29 Claims, 5 Drawing Sheets

METHOD AND APPARATUS FOR GENERATING BILLING DATA IN A TELECOMMUNICATION SYSTEM

BACKGROUND OF THE INVENTION

This invention relates to telecommunications, and in particular apparatus and methods for generating billing data for subscribers in a telecommunications system.

In mobile communications systems, such as cellular telephone networks, billing is conventionally carried out on a subscriber-by-subscriber basis. Herein, the term "subscriber" refers to the person authorised to access a mobile communications system, using a mobile station or a fixed station.

In a GSM system, when a subscriber utilises a mobile communications resource, such as conducting a voice call, sending a fax, retrieving voicemail messages, sending text messages, etc., a call detail record is produced is the network which is sent to a billing centre.

At the billing centre, the call detail records are logged on-line, and periodically transferred to an off-line billing system, for example on magnetic tapes. The call detail records are rated to attach a charge to each usage recorded in the call detail records. This charge depends on the type of service utilised, the length of a connection utilised, and may also depend on the particular type of subscription which the subscriber holds.

At the end of a billing period, for example at the end of each month, the rated call detail records are processed on a subscriber-by-subscriber basis to produce an individual bill for each subscriber.

However, this conventional method of billing implemented in the billing centre is not particularly convenient for customers having multiple subscribers utilising the mobile communications system. It can be difficult to manage costings for a group of subscribers when individual bills are separately received.

U.S. Pat. No. 4,979,207 proposes a cellular telephone billing system which processes call detail records or calls made by subscribers belonging to multiple-subscriber customers to produce bills. The call detail records are processed to attach a key identification number for each subscriber. The key identification number and a chosen associated information format are used to select a type of billing report required by the customer so that it may be provided during billing. However, this only provides a way to produce a desired format of billing report for a customer, and does not affect the charge made to a customer.

SUMMARY OF THE INVENTION

It would be desirable to provide apparatus whereby charging structures which are flexible, easy to understand, and logical, may be implemented for associated groups of subscribers in a mobile communications system.

In accordance with one aspect of the invention there is provided apparatus for generating billing data for subscribers in a telecommunications system, said apparatus comprising:

data storage means for holding subscriber records for a plurality of groups of subscribers, each of said groups comprising a plurality of subscribers for which a combined subscription is held, said groups comprising different numbers of subscribers; and data processing means for analysing call data and applying one of a number of different predetermined call charging tariffs to a call made by a subscriber in one of said groups, in dependence on the group of which the subscriber is a member, in order to generate charging data for said call.

This aspect of the invention allows a common charging tariff to be applied for each subscriber in a group for which a combined subscription is held, for example by a business concern.

According to a further aspect of the invention there is provided apparatus for generating billing data for subscribers in a telecommunications system, said apparatus comprising:

data storage means for holding subscriber records for a plurality of groups of subscribers, each of said groups comprising a plurality of subscribers and said groups comprising different numbers of subscribers; and data processing means comprising means for relating respective usage allocations to each of said group, each said allocation being shared by subscribers in the related group.

This aspect of the invention provides apparatus whereby a usage allocation may be allocated not only to a single subscriber, but by groups of subscribers of various sizes, thereby allowing flexibility and the utilisation of usage allocations in accordance with the desires of different groups of subscribers.

According to a yet further aspect of the invention there is provided apparatus for generating billing data for subscribers in a mobile communications system, said apparatus comprising:

data storage means for storage subscriber records and usage allocation records, said usage allocation records being shared by respective groups of subscribers, each said group comprising a plurality of subscribers; and data processing means for analysing call data and reducing the usage allocation in a usage allocation record when said call data indicates that a subscriber in a group sharing said usage allocation record has made a call in the mobile communications system, such that said usage allocation record indicates the amount of said usage allocation remaining after said call.

Thus, by means of a common usage allocation record, the current amount of usage allocation remaining may be readily determined either during a billing period or at the end of a billing period.

According to a still further aspect of the invention there is provided apparatus for generating billing data for subscribers in a mobile communications system, said apparatus including data processing means comprising:

first means for associating a shared allocation of usage with a group consisting of a plurality of subscribers; and second means for processing call data and for reducing said shared allocation when said call data indicates that a call has been made by any of said plurality of subscribers in the group.

By sharing usage allocations, a given usage allocation can be more readily utilised in a given billing period, irrespective of fluctuations of usage by an individual subscriber in a group.

According to a further aspect of the invention there is provided apparatus for generating billing data for subscribers in a mobile communications system, said apparatus including data processing means comprising:

first means for selecting a billing account;

second means for allocating a plurality of groups of subscribers to said selected account;

third means for allocating a plurality of subscribers to each of said groups; and fourth means for processing call data for each subscriber allocated to said billing account to generate said billing data for said account; said billing data including a total charge for said account and a total charge for each said group.

Thus, a set of billing data for an account may be provided which sets out the charge not only for the account as a whole, but also for different groups of subscribers in the account, such as different departments of a business concern.

BRIEF DESCRIPTION OF THE DRAWINGS

Further features and advantages of the present invention will be apparent from the following description of preferred embodiments of the invention, wherein.

DETAILED DESCRIPTION

Figure 1:
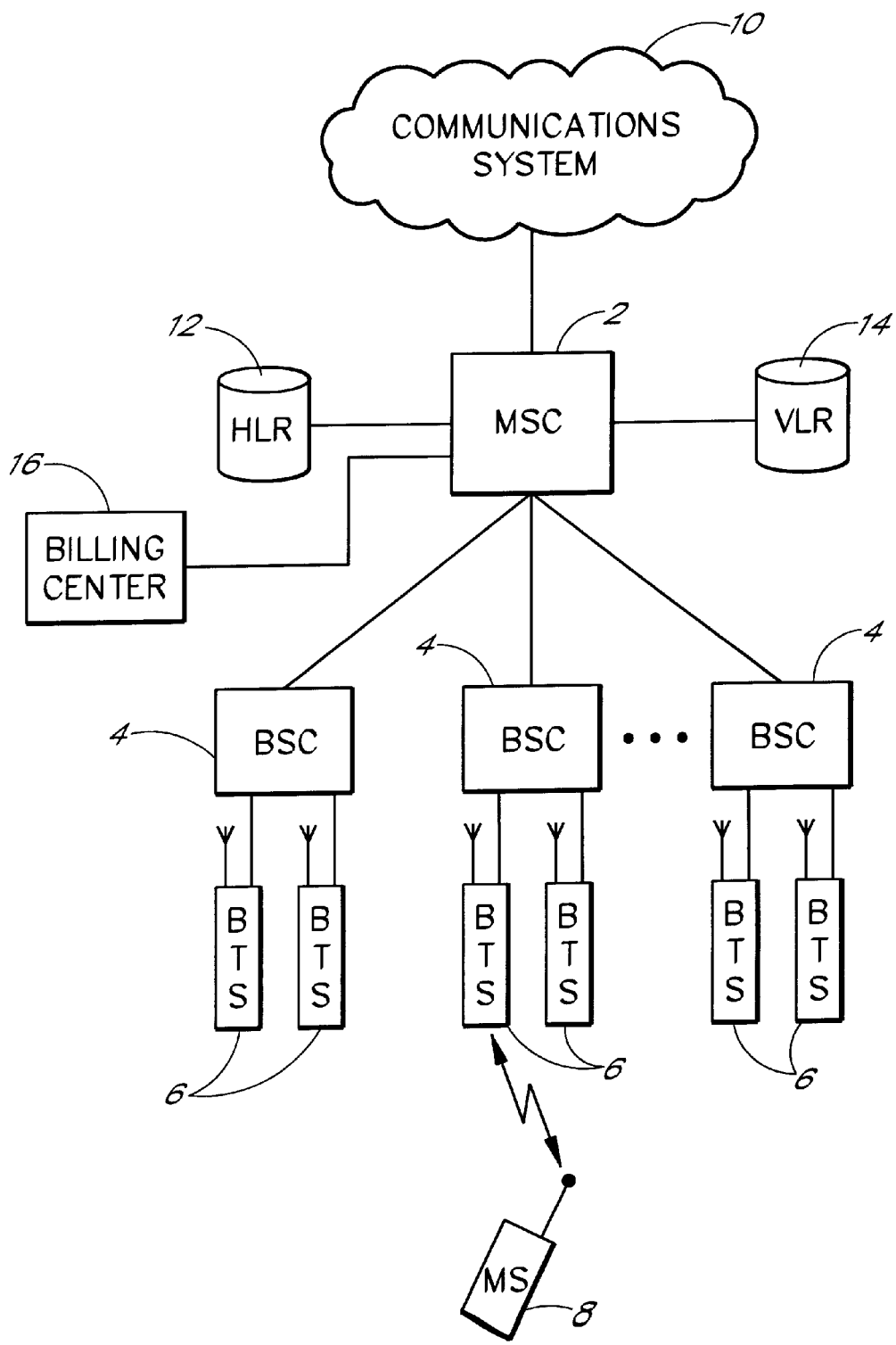
FIG. 1 is a block diagram schematically illustrating a mobile communication network in accordance with an embodiment of the invention.

FIG. 1 shows a cellular communications network, such as a GSM network, which is in itself known and will not be described in detail. A mobile switching centre (MSC) 2 is connected via communications link to a number of base station controllers (BSCs) 4. The BSCs 4 are dispersed geographically across areas served by the MSC 2. Each BSC 4 controls one or more base transceiver stations (BTSs) 6 located remote from, and connected by further communications links to, the BSC. Each BTS 6 transmits radio signals to, and receives radio signals from, mobile stations 8 which are in an area served by that BTS. That area is referred to as a "cell". A mobile communications network is provided with a large number of such cells, which are ideally contiguous to provide continuous coverage over the whole network territory.

The MSC 2 is also connected via communications links to other MSCs in the remainder of the communications system 10, and to a public services telephone network (PSTN), ISDN lines, etc., which are not illustrated. The MSC is provided with a home location register (HLR) 12 which is a database storing subscriber authentication data, and a visitor location register (VLR) 14 which is a database temporarily storing subscriber authentication data for mobile stations active in its area.

When the user of the mobile station 8 utilises a telecommunications service provided by the mobile communications network, for example by initiation a voice call, sending a fax, sending data, sending text messages, or retrieving voicemail, etc., a call detail record is generated in the network, which is sent to a billing centre 16.

The call detail records include, amongst other information, the international mobile subscriber identity (IMSI) and the telephone directory number (MSISDN) used for the call, along with data allowing the computation of a charge for the call. This data includes the date and time of the beginning of the call, its duration, the nature of the service provided during the call (voice, data, short messages, etc) the called party number, and in the case of packet services, the volume of transmitted data.

Table 1 illustrates a set of subscription types and charging structures which may be implemented in the billing centre 16 in accordance with this embodiment of the invention.

| Subscription type | 1st handset monthly charge | Monthly charge per additional handset | Number of users allowed | Shared bundle | peak n/min | off-pk n/min |
|---|---|---|---|---|---|---|
| 1 | N | N/2 | 1–2 | 60 mins | 10 n | 5 n |
| 2 | 2N | N/2 | 1–3 | 200 mins | 9 n | 4 n |
| 3 | 3N | N/2 | 1–4 | 360 mins | 8 n | 4 n |
| 4 | 4N | N/2 | 1–5 | 540 mins | 7 n | 3 n |
| 5 | 7N | N/2 | 1–10 | 1000 mins | 7 n | 3 n |
| 6 | 18N | N/2 | 1–25 | 2500 mins | 7 n | 3 n |
| 7 | 36N | N/2 | 1–50 | 5000 mins | 7 n | 3 n |

As indicated, seven subscription types are provided having varying charging details. The charges shown are in cost units N and n for illustrative purposes.

Any number of subscribers (from a single subscriber to a group of 50, or more if desired) may be allocated to a single subscription, depending on the subscription type held. In each subscription type, a "bundle" of pre-paid call time usage allocation is provided for use during a single month. A monthly subscription charge is levied for the first subscriber according to the subscription type held, and a set monthly subscription charge is charged for every further subscriber added to the subscription. Subscribers pay call charges for non-bundle-time calls at peak times, and off-peak times, according to the subscription held.

From table 1, it will be apparent that the choice of a different subscription alters the characteristics of the subscription type as follows:

1. The monthly subscription charge for a single subscriber subscription generally increases.

2. The monthly subscription charge for a group subscription generally increases.

3. The number of subscribers allowed in a group subscription generally increases (from 2 to 50).

4. The bundle of pre-paid usage allocation (call time) generally increases.

5. The call charging tariffs, for both peak and off-peak calls, generally decrease.

It is also a feature of this embodiment of the invention that an account holder may have multiple subscriptions, including group subscriptions and/or individual subscriptions, in a single account managed by the billing centre 16.

Figure 2:
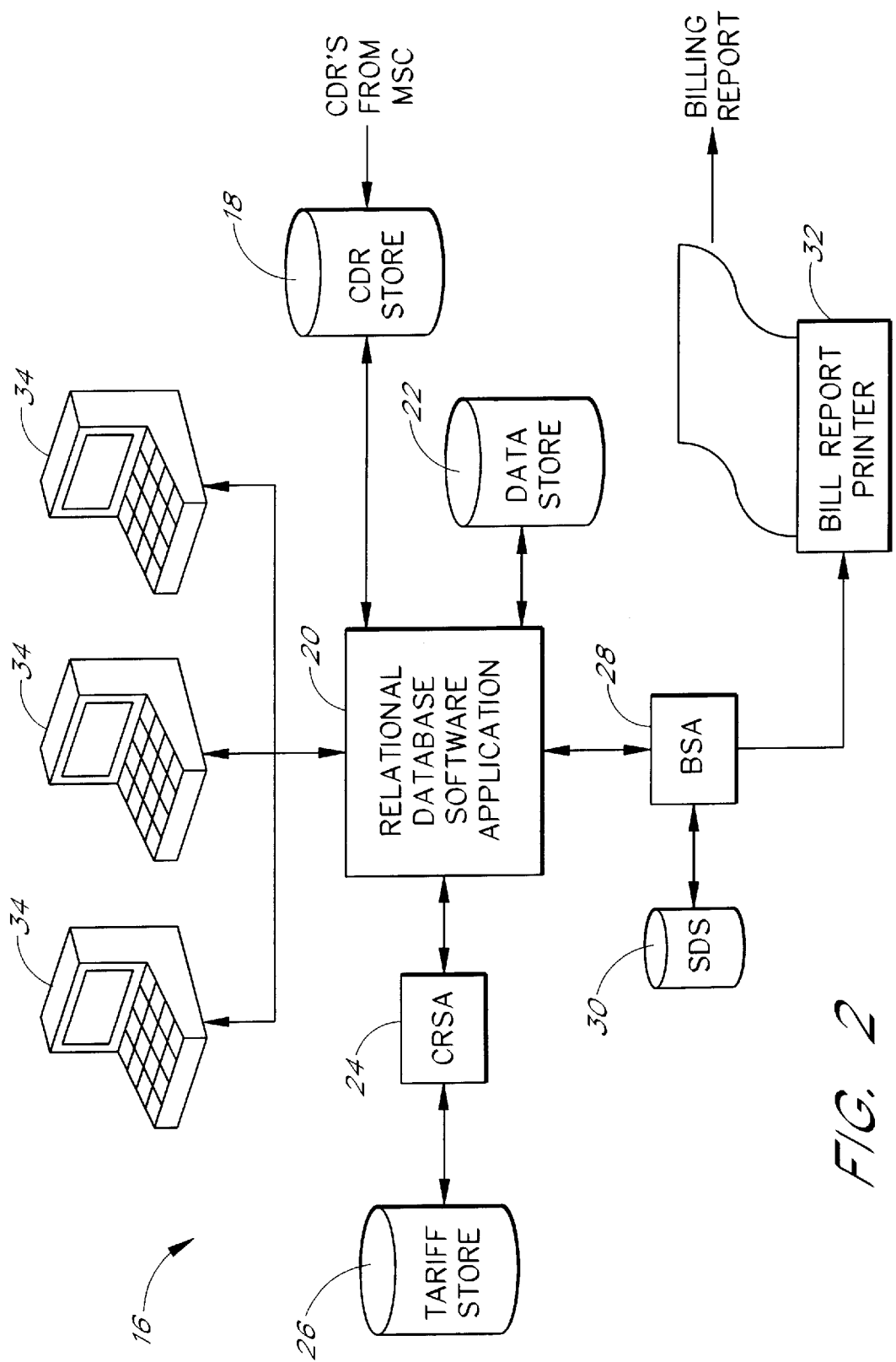
FIG. 2 is a block digram schematically illustrating a billing centre in accordance with an embodiment of the invention.

FIG. 2 illustrates features of the billing centre schematically. The billing centre includes a call detail record logging store 18, a relational database software application 20 and its associated data store 22, a call rating software application 24 and its associated tariff data store 26, a billing software application 28 and its associated subscription data store 30, and a billing report printing apparatus 32.

Each of the software applications 20, 24, 28 is implemented in an appropriate data processing means, such as a mainframe computer or a computer workstation. The data store 18 may consist of magnetic tape data storage, and/or other suitable storage media, such as hard disks.

Also connected to the relational database application 20 is a set of customer service workstations 34, allowing the on-line data input and retrieval of subscriber, group and account details from the relational database.

Figure 3:
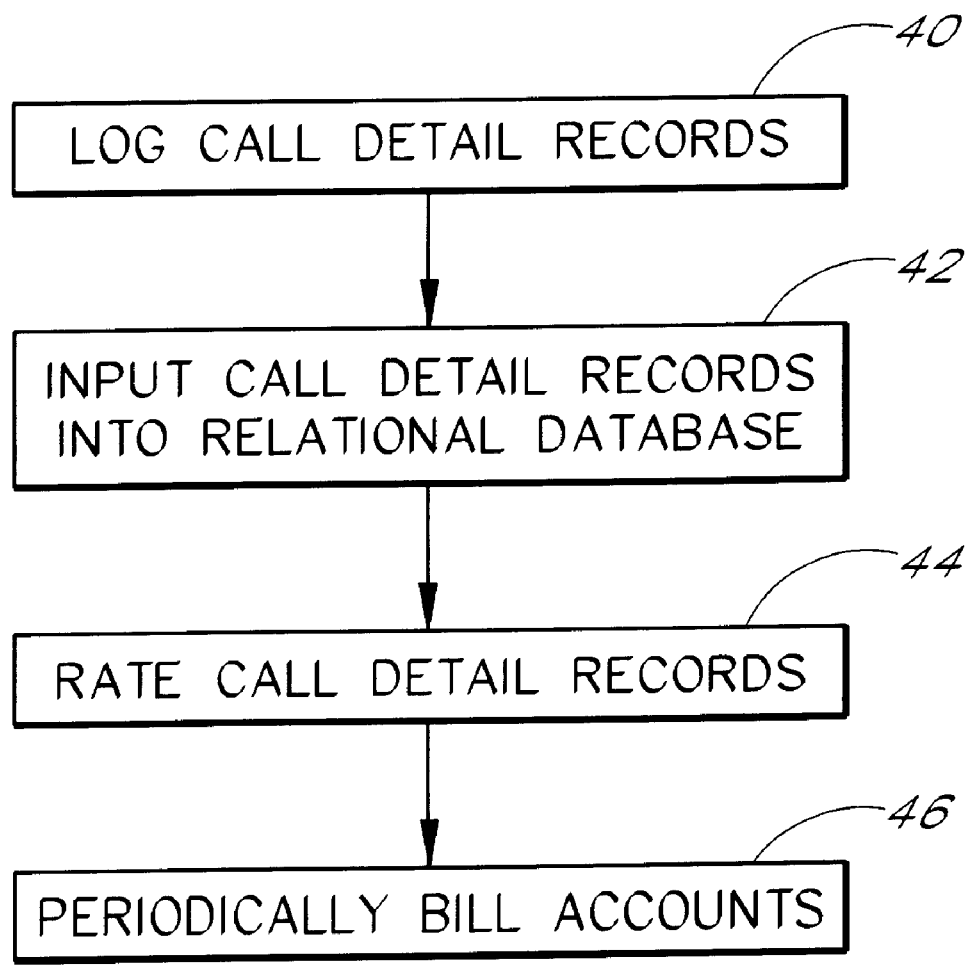
FIG. 3 is a flow diagram illustrating procedures carried out by the call billing centre of FIG. 2.

FIG. 3 illustrates procedures carried out in the billing centre 16. The call detail records are received continually, in real time, from the MSC to which the billing centre is connected and logged in logging store 18, step 40. These logged call detail records are then periodically input in batches into the relational database 20/22.

The call detail records, once in the relational database 20/22, are then rated in date and time order by the rating application 24, referring to the tariff store 26 to attach an appropriate charge to each call detail record. The attached charge is stored in the relational database 20/22.

The relational database 20/22 holds not only call detail records but also subscriber detail records, bundle records (to be described below), group records and billing account records. The relational database holds subscriber data for each subscriber identifying the billing account to which the subscriber belongs, and if the subscriber is an individual subscriber, details identifying the subscriber type which the subscriber holds, or if the subscriber belongs to a group, data identifying the group to which the subscriber belongs. The group records indicate the type of subscription held for the group. The relational database is configured so that any details relating to a billing account held in the database may be retrieved by selecting the appropriate billing account, any details relating to a group held on the database may be retrieved by selecting the appropriate group, and any details relating to a particular subscriber held in the database may be retrieved by selecting the appropriate subscriber.

Each bundle record is associated with a particular subscription, whether that is an individual subscriber subscription or a group subscription. Each bundle record holds data indicating an amount of pre-paid allocated call-time usage (referred to as a call time "bundle" herein) allowed for the subscription during each billing period, and data indicating the amount of that usage allocation remaining during a billing period. In this embodiment of the invention, the usage allocation is a duration of call time. In the case of a single-subscriber subscription, the bundle is related to a single directory number (MSISDN) and may be used by that subscriber only. In the case of a group subscription, the bundle is related to a number of directory numbers (MSISDNs) and may be used by any subscriber in the group in part or in whole.

In this embodiment no charges are made by the network operator for usage of the bundle time, and therefore it is desirable for subscribers to utilise all of their bundle time during a billing period.

Figure 4:
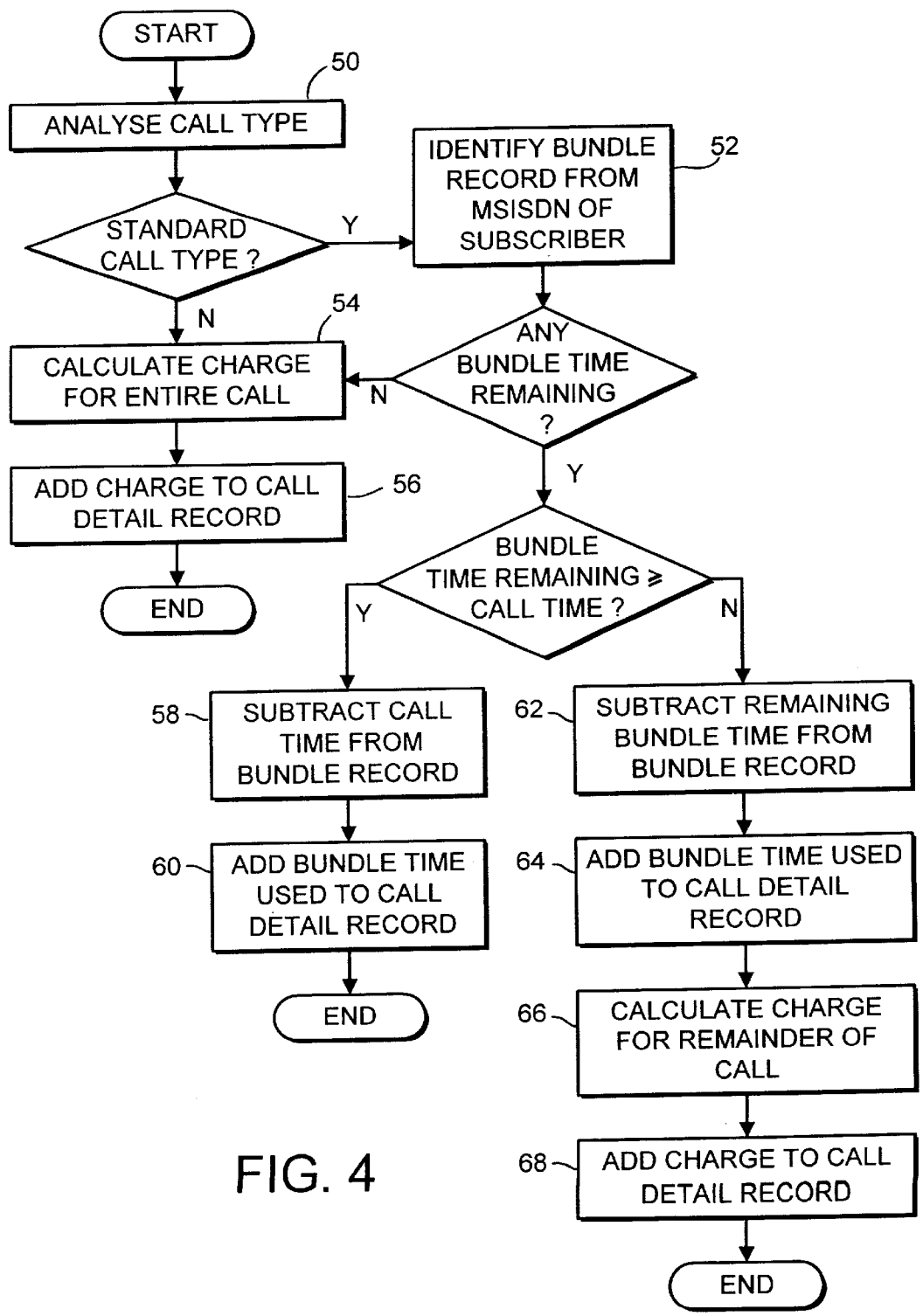
FIG. 4 is a flow diagram illustrating a call rating procedure carried out by the billing centre of FIG. 2.

FIG. 4 illustrates the rating procedure carried out by the rating application 24 for a single call detail record. The call detail record is first analysed to determine whether call made is of a standard call type, step 50. For example, standard calls may include national fixed-line terminating calls, whereas calls made to other mobile stations, premium rate services or international calls will be treated as non-standard, since they are generally more costly.

If the call type indicated in the call detail record is non-standard, the rating application 24 proceeds to calculate a charge for the entire call, by retrieving non-standard tariff charging details held in the tariff store 26, step 54. When the charge has been calculated, data indicating the charge is added to the call detail record, 56, to allow the call to be billed at a later stage.

If in step 50 the call is identified as a standard call type, it is determined that the call duration may be subtracted from any available bundle time, rather than being charged for directly. In order to identify the bundle record holding the appropriate usage allocation data, the rating application 24 determines the directory number (MSISDN) from which the call was conducted, whereby the bundle record is identified by association in the relational database 20/22, step 52.

If the bundle record indicates that all of the bundle time originally available at the start of the billing period has been used already, the rating application 24 proceeds to retrieve data indicating the subscription type of the subscriber from the relational database 20/22 and standard tariff charges for that subscription type from the tariff store 26, and thereby to calculate the charge for the entire call, step 54. The calculated charge is added to the call detail record, step 56.

If however there is bundle time remaining, it is checked whether the bundle time remaining is greater than or equal to the duration of the call. If so, the duration of the call is subtracted from the remaining bundle time in the bundle record, step 58, and data indicating the bundle time used is added to the call detail record, step 60, for use in subsequent billing of the call. No charge is attached to the call detail record.

If the bundle time remaining is less than the duration of the call, the remaining bundle time is subtracted from the remaining usage allocation in the bundle record (then no usage allocation remains) and data is added to the call detail record indicating the bundle time subtracted, steps 62 and 64.

Next, the charge for the remaining duration of the call is calculated by retrieving the subscription type held in the relational database 20/22, and the appropriate standard charging tariff details held in the tariff store 26, step 66. Data indicating the charge to be levied is then added to the call detail record, 68, for use during subsequent billing of the call.

At the end of a billing period, all of the call detail records pertaining to calls conducted during the billing period are stored in rated form on the relational database 20.

Figure 5:
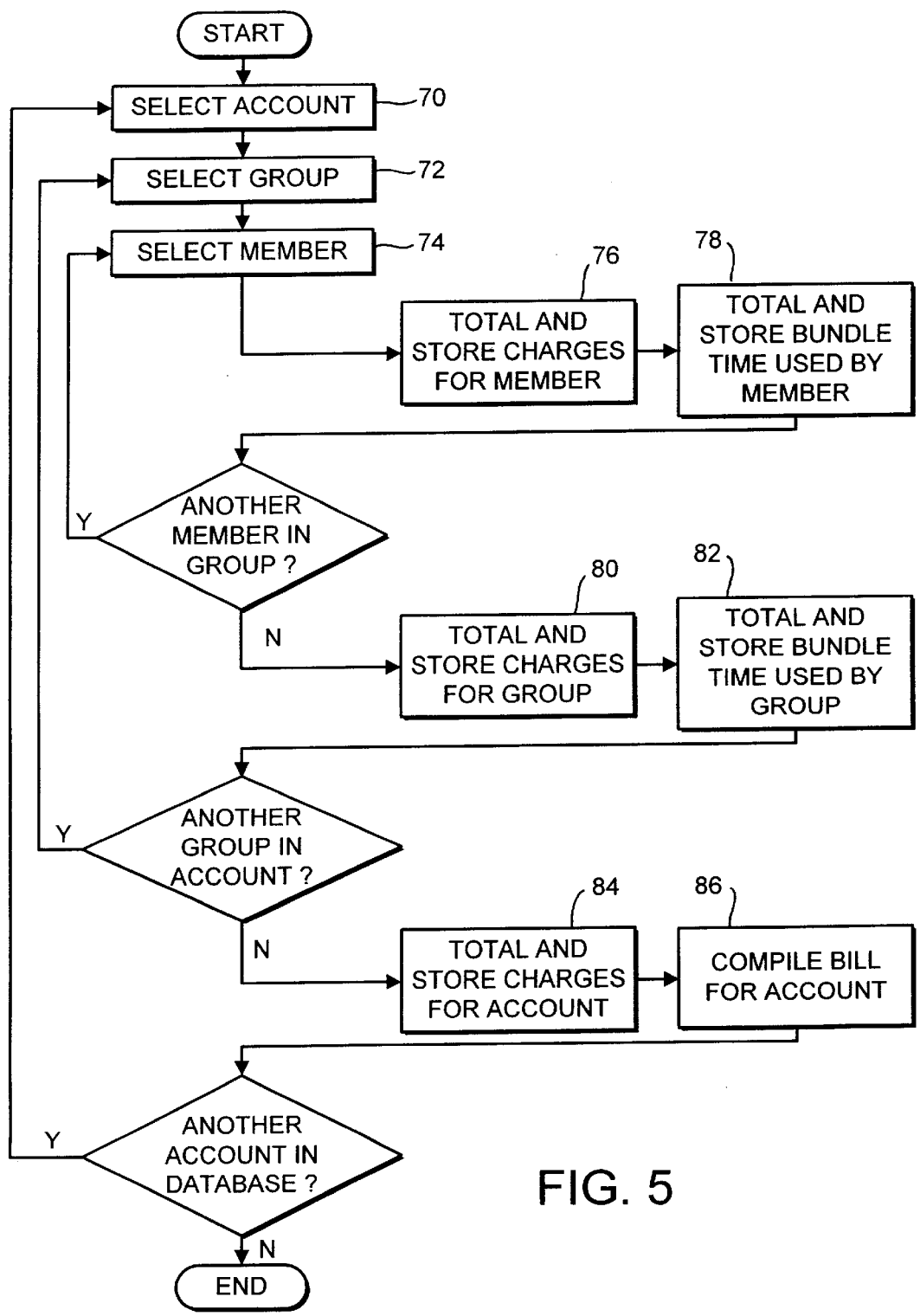
FIG. 5 is a flow diagram illustrating a billing procedure carried out in the billing centre of FIG. 2.

FIG. 5 illustrates the procedure followed by the billing application 28 at the end of each billing period in order to generate billing data to be transmitted to the billing report printing apparatus 32.

First, the billing application 28 selects an account in the relational database 20/22, step 70, and the first group of subscribers in that account is selected in step 72. The first subscriber in the selected group is selected in step 74.

For the selected member, the billing application 28 retrieves each of the call detail records held in relational database 20/22 for the preceding billing period in turn and totals the charges to be billed for that subscriber using the charge data added to each call detail record by the rating application 24, and by totalling the periodic subscription charge indicated by the subscription data held in the relational database 20/22, using the subscription charge store 30, step 76.

The billing application 28 also totals the bundle time used by the subscriber during the preceding billing period, as indicated by the data added to the subscriber's call detail records by the rating application 24, step 78. The billing application stores data indicating the charge to be billed for that subscriber and the amount of bundle time used by the subscriber.

The billing application 28 then proceeds to perform steps 74, 76 and 78 for each subscriber in the selected group, until charging and bundle time data has been totalled for each subscriber in the selected group. Then, the charges stored for each subscriber in the group are totalled and data indicating the total charge for the group is stored, step 80, and the bundle time used by each subscriber is totalled and data indicating the total bundle time used by subscribers in the group is stored, step 82. The procedure returns to step 72 if the account consists of a number of groups, until there are no more groups remaining in the account.

Next, the total group charges calculated in step 80 are totalled and a total charge for the account is calculated and stored, step 84.

In step 86, the billing details for the account are compiled, using the charges and bundle times calculated by the billing application 28, and using other data in the call detail records retrieved by the billing application 28. The billing details include the subscription charges leveled, the usage charges incurred, and the amount of the subscriber's group's allocation of bundle time used, for each subscriber in the account, the total subscription charges levied, the total usage charges incurred, and the total usage allocation used by each group, the total charge to be posted to the account, and individual call itemisation details indicating the date, time, duration, cost and terminating point for each call made by subscribers in the account during the preceding billing period.

Once the billing details have been compiled for an account, the billing details may be transmitted to the billing report printing apparatus, 32. The billing report printing apparatus 32 formats the billing details to generate an invoice for the account on one page, a group billing report on one or more further pages, and an individual call itemisation report on one or more further pages. The invoice specifies the total charges for the account to be paid by the account holder. The group billing report indicates for each group in the account the total subscription charges incurred for the group and the total bundle time used by the group, along the total subscription charges and the total bundle time used by each subscriber in the group. This allows the account holder to readily understand the charges incurred by each group in the account. The individual call itemisation report shows the date, time, duration, charge and terminating point for each call made by every subscriber in the account.

The embodiment of the present invention described provides a billing apparatus, in the form of a billing centre, for example similar to that shown in FIG. 2, whereby charging structures allowing associated groups of subscribers belonging to the same account, and consisting of various numbers of subscribers, to be allocated collective charging tariffs, and/or a shared allocation of pre-paid usage. Furthermore, by calculating the usage allocation for each group actually used by each subscriber in a group, and by the group as a whole, during a billing period, and indicating those figures in the billing report generated for an account holder, the account holder is readily able to monitor the usage of the pre-paid allocations for groups in the account. In case the account holder finds that one or more groups of subscribers in the account are not using their subscription effectively, the account holder can ask the network operator to transfer the group to a different subscription type.

A billing centre for a mobile communication system is provided which allows groups of subscribers sharing a single account to be identified both during the call rating procedure, during which call detail records are to add a charge to the call detail record, and/or to add a usage of a pre-paid usage allocation to the call detail records, and during the production of billing details at the end of a billing period.

A relational database holds usage allocation records which pertain either to a single subscriber, or to a group of subscribers. The group of subscribers may consist of any of 2 to 50, or more, subscribers, depending on the subscription type held by the group.

It is to be mentioned that the elements of the billing centre illustrated in FIG. 2 need not be located at a single centre. For example, the billing data produced by the billing application 28 may be transferred to magnetic tapes and transported to a printing centre for printing by the billing report printing apparatus 32.

In the case of subscriptions being taken through a service provider, rather than the network operator, the call detail records held in the relational database 20/22 for the proceeding billing period, once rated, may be sent to the service provider for processing using a billing application belong to the service provider. Alternatively, the billing details may be generated by the billing application 28, and the billing details transmitted to the service provider for the production of billing reports by the service provider.

In the embodiment described above, the usage allocation consists of a call time bundle. However, other usage allocations may be provided, such as a bundle consisting of a number of short messages, a number of pages of fax transmission, an amount of data, etc. Furthermore, the usage allocation need not be pre-paid in entirety—the bundle resource used may for example be charged at a reduced tariff.

It will also be appreciated that various other modifications and variations may be employed in relation to the above-described embodiment without departing from the spirit or scope of the present invention.

What is claimed is:

1. Apparatus for generating billing data for subscribers in a telecommunications system, said apparatus comprising:
   data storage means arranged to hold subscriber records and shared usage allocation records for a plurality of groups of subscribers, said subscriber records storing data indicating subscription types held by said groups; and
   data processing means arranged to:
      relate a shared usage allocation of an original magnitude to each of said groups at the start of each of a series of predetermined periods, the original magnitude of each said shared usage allocation being predetermined in accordance with the subscription type held for each group, respectively; and
      analyze call data, indicating that a subscriber in one group has made a call, to determine whether said call falls within predetermined call type criteria, and to reduce said allocation for said one group when said criteria are met.

2. Apparatus according to claim 1, wherein said data processing means is arranged to analyze said call data, and to apply one of a number of different predetermined call charging tariffs to said call, in dependence on the subscription type held for said one group, if it is detected that none of said allocation for said one group remains, in order to generate billing data for said call.

3. Apparatus according to claim 1, wherein said storage means is arranged to hold billing account records, each of said groups being associated with a respective billing account, and said processing means is arranged to generate billing data for the production of a combined billing report for each said billing account.

4. Apparatus according to claim 3, wherein said processing means is arranged to generate billing data indicating the total amount of the group's usage allocation used by all subscribers in said group at the end of a said period.

5. Apparatus according to claim 4, wherein said processing means is arranged to generate billing data indicating the total amount of the group's usage allocation used by each individual subscriber in said group at the end of a said period.

6. Apparatus according to claim 1, wherein said shared usage allocation is an allocation of call time which may be used in part or in whole by any of the subscribers in the group.

7. Apparatus according to claim 1, wherein said shared usage allocation is an allocation of an amount of data which may be used in part or in whole by any of the subscribers in the group.

8. Apparatus according to claim 1, wherein a plurality of group subscription types are predetermined, different said original magnitudes being predetermined for different group subscription types and the maximum number of subscribers in a group being predetermined and dependent on the group subscription type.

9. Apparatus according to claim 8, wherein the number of subscribers allowed in a group generally increased with the original magnitude of the usage allocation defined for a group subscription type.

10. Apparatus according to claim 1, said processing means comprises:
    first means arranged to select a billing account;
    second means arranged to select a plurality of said groups of subscribers associated with said billing account;
    third means arranged to select each subscriber individually for each of said plurality of groups; and
    fourth means arranged to process call data for each subscriber allocated to said billing account to generate a billing report for said account, said billing report including data indicating a total charge for said account and a total charge for each of said plurality of groups.

11. A method of generating billing data for subscribers in a telecommunications system, said method comprising:
    holding subscriber records for a plurality of groups of subscribers;
    relating respective usage allocations of an original magnitude to each said group during each of a series of predetermined billing periods in order to generate billing data, the original magnitude of each said respective usage allocation being predetermined in accordance with a subscription type held for each said group, each said allocation being shared by subscribers in the related group; and
    analyzing said call data to determine whether said call falls within predetermined call type criteria, and to reduce said usage allocation only when the criteria are met.

12. A method according to claim 11, wherein said usage allocations are each allocations of call time which may be used in part or in whole when processing call data for a call made by any of the respective subscribers in the related groups.

13. A method according to claim 12, wherein said usage allocations are each allocations of an amount of data which may be used in part or in whole when processing call data for a call made by any of the respective subscribers in the related groups.

14. A method according to claim 11, further comprising processing call data to reduce one of said usage allocations for a call made by any of the subscribers in the related group.

15. A method according to claim 11, further comprising generating billing data indicating the total amount of the group's usage allocation used by all subscribers in said group at the end of a billing period.

16. A method according to claim 11, further comprising generating billing data indicating the total amount of the group's allocation used by each individual subscriber in said group at the end of a billing period.

17. A method according to claim 11, wherein a plurality of group subscription types are predetermined, different said original magnitudes being predetermined for different group subscription types and the maximum number of subscribers in a group being predetermined and dependent on the group subscription type held for said group.

18. A method according to claim 17, wherein the number of subscribers allowed in a group generally increases with the original magnitude of the usage allocation defined for a group subscription type.

19. A method of generating billing data in a mobile communications network, said method comprising:
    holding subscriber records for a plurality of groups of subscribers;
    holding usage allocation records, each of said usage allocation records being for containing a usage allocation to be shared by subscribers in a respective group;
    storing a usage allocation having an original magnitude in each of said usage allocation records at the start of each of a series of predetermined periods, the original magnitude of each said shared usage allocation being predetermined in accordance with a subscription type held for each group respectively;
    providing a telecommunications service to a subscriber in one group;
    generating a call detail record and transmitting said to a billing center; and
    analyzing said call detail record to identify the usage allocation record held for said one group, and reducing the usage allocation in said usage allocation record in accordance with the usage detailed in said call detail record.

20. A method according to claim 19, further comprising reducing the usage allocation in the same usage allocation record when a different said call detail record indicates that a different subscriber in the same group has made a call in the mobile communications network.

21. A method according to claim 19, further comprising attaching data indicating the amount of said reduction in usage allocation to a call detail record when the call detail record is processed.

22. A method according to claim 19, further comprising identifying a usage allocation record associated with a subscriber by means of a subscriber identity number indicated by a call detail record.

23. A method according to claim 21 wherein said subscriber identity number is a telephone directory number.

24. A method according to claim 19, further comprising reducing said usage allocation only when said call detail record indicates that a calling within predetermined call type criteria has been made, and when said call type criteria are not satisfied, calculating charging data to be attached to said call detail record with reference to call charging tariff data.

25. Apparatus for generating billing data for subscribers in a telecommunications system, said apparatus comprising:
    a data store arranged to hold subscriber records and shared usage allocation records for a plurality of groups of subscribers, said subscriber records storing data indicating subscription types held by said groups; and a data processor having software arranged to relate a shared usage allocation to each of said groups at the start of each of a series of predetermined periods, the original amount of each said shared usage allocation being predetermined in accordance with the subscription type held for each group, respectively and arranged for analyze call data, indicating that a subscriber in one group has made a call, to determine whether said call falls within predetermined call type criteria, and to reduce said allocation for said one group when said criteria are met, and to apply one of a number of different predetermined call charging tariffs to said call, in dependence on the subscription type held for said one group if none of said allocation for said one group remains, in order to generate billing data for said call.

26. Apparatus according to claim 25, wherein said data store includes billing account records, each of said groups being associated with a respective billing account, and said processing means is arranged to generate billing data for the production of a combined billing report for each said billing account.

27. Apparatus according to claim 25, wherein said processor further comprises software arranged to generate billing data indicating the total amount of the group's usage allocation used by all subscribers in said group at the end of a said period.

28. Apparatus for generating billing data for subscribers in a telecommunications system, said apparatus comprising:

data storage arranged to hold subscriber records and shared usage allocation records for a plurality of groups of subscribers, said subscriber records storing data indicating subscription types held by said groups; and a data processor arranged to:

relate a shared usage allocation to each of said groups at the start of each of a series of predetermined periods, the original amount of each said shared usage allocation being predetermined in accordance with the subscription type held for each group, respectively; and analyze call data, indicating that a subscriber in one group has made a call, to determine whether said call falls within predetermined call type criteria, and to reduce said allocation for said one group when said criteria are met unless none of said allocation for said one group remains, then to apply one of a number of different predetermined call charging tariffs to said call, in dependence on the subscription type held for said one group in order to generate billing data for said call.

29. Apparatus for generating billing data for subscribers in a telecommunications system, said apparatus comprising:

data storage arranged to hold subscriber records and shared usage allocation records for a plurality of groups of subscribers, said subscriber records storing data indicating subscription types held by said groups; and a data processor arranged to:

relate a shared usage allocation of an original magnitude to each of said groups at the start of each of a series of predetermined periods, the original magnitude of each said shared usage allocation being predetermined in accordance with the subscription type held for each group, respectively; and analyze call data, indicating that a subscriber in one group has made a call, to determine whether said call falls within predetermined call type criteria, and to reduce said allocation for said one group when said criteria are met;

wherein a plurality of group subscription types are predetermined, different said magnitudes being predetermined for different group subscription types and the maximum number of subscribers in a group being predetermined and dependent on the group subscription type.

* * * * *

UNITED STATES PATENT AND TRADEMARK OFFICE
CERTIFICATE OF CORRECTION

PATENT NO. : 6,173,171 B1
DATED : January 9, 2001
INVENTOR(S) : Plush et al.

It is certified that error appears in the above-identified patent and that said Letters Patent is hereby corrected as shown below:

<u>Title page,</u>
ABSTRACT, first line, please change "communication" to -- communications --.

<u>Column 1,</u>
Line 41, please change "or" to -- of --.

<u>Column 2,</u>
Line 30, please change "storage" to -- storing --.

<u>Column 3,</u>
Line 18, please change "communication" to -- communications --.
Line 35, please change "link" to -- links --.
Line 59, please change "initiation" to -- initiating --.

<u>Column 4,</u>
Line 67, please change "the" to -- for --.

<u>Column 5,</u>
Line 53, please change "whether call" to -- whether the call --.

<u>Column 7,</u>
Line 16, please change "leveled" to -- levied --.
Line 37, please change "along the" to -- along with the --.
Line 60, please change "communication" to -- communications --.

<u>Column 8,</u>
Line 16, please change "belong" to -- belonging --.

<u>Column 9,</u>
Line 53, please change "the" to -- those --.

UNITED STATES PATENT AND TRADEMARK OFFICE
CERTIFICATE OF CORRECTION

PATENT NO. : 6,173,171 B1
DATED : January 9, 2001
INVENTOR(S) : Plush et al.

It is certified that error appears in the above-identified patent and that said Letters Patent is hereby corrected as shown below:

<u>Column 10,</u>
Line 34, please change "transmitting said" to -- transmitting same --.
Line 58, please change "a calling within" to -- a call falling within --.

Signed and Sealed this

Twenty-eighth Day of May, 2002

Attest:

*Attesting Officer*

JAMES E. ROGAN
*Director of the United States Patent and Trademark Office*